July 9, 1968
H. MAGNUSKI
3,392,392
BEARING MEASUREMENT SYSTEM USING STATISTICAL SIGNAL
PROCESSING BY ANALOG TECHNIQUES
Filed June 5, 1967
3 Sheets-Sheet 1
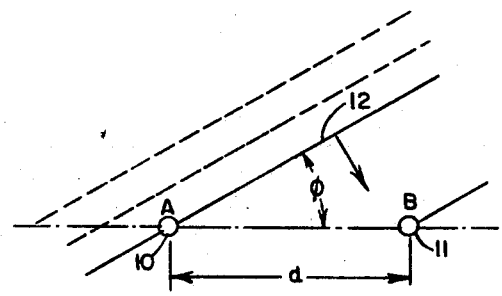
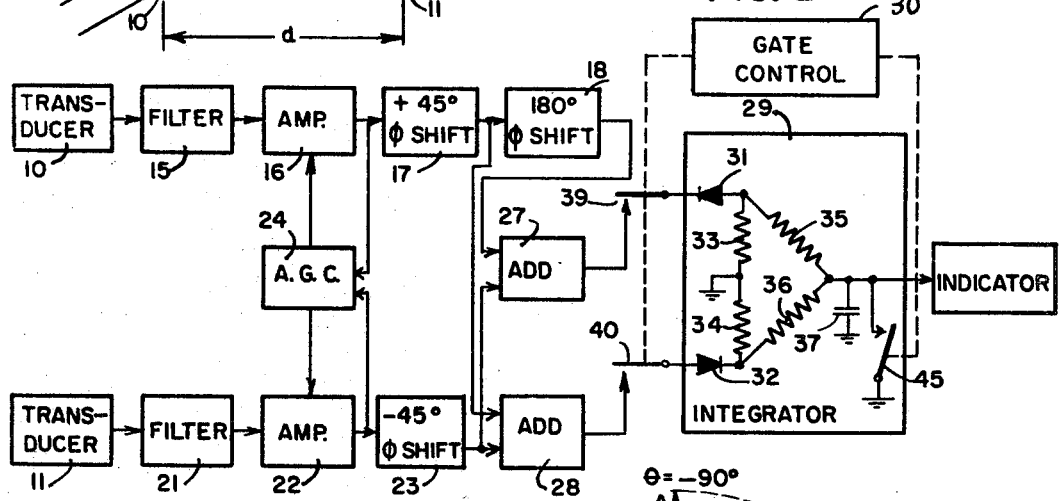
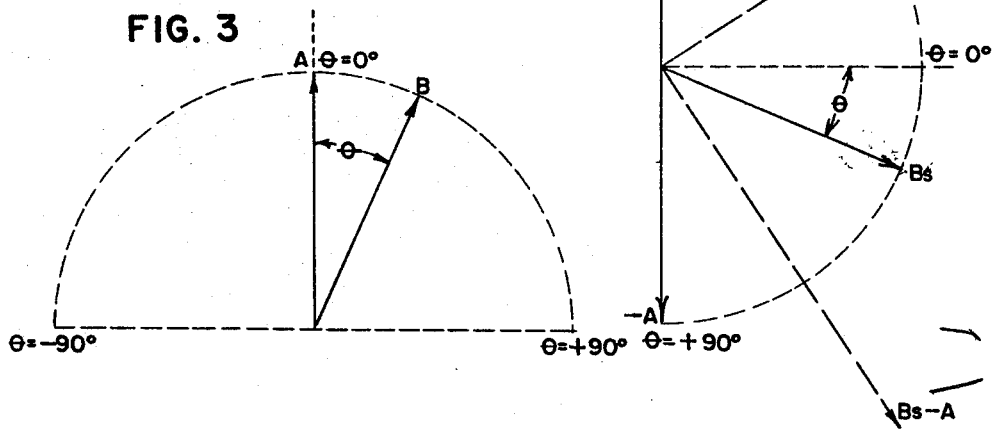
Inventor
HENRY MAGNUSKI
BY Mueller, Aichele & Rauner
ATTYS.

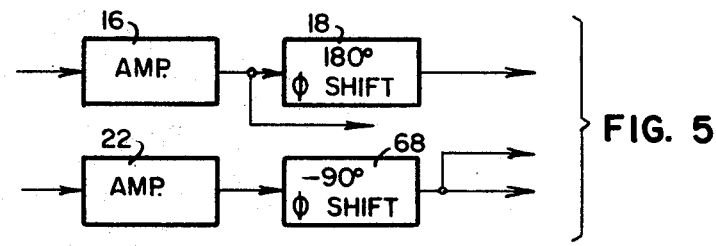
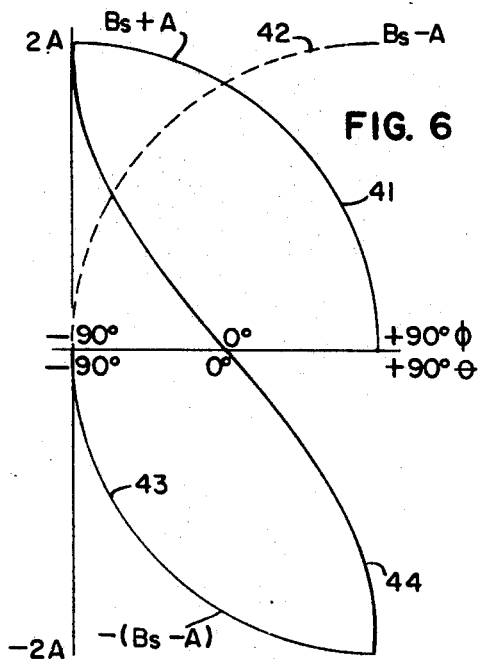
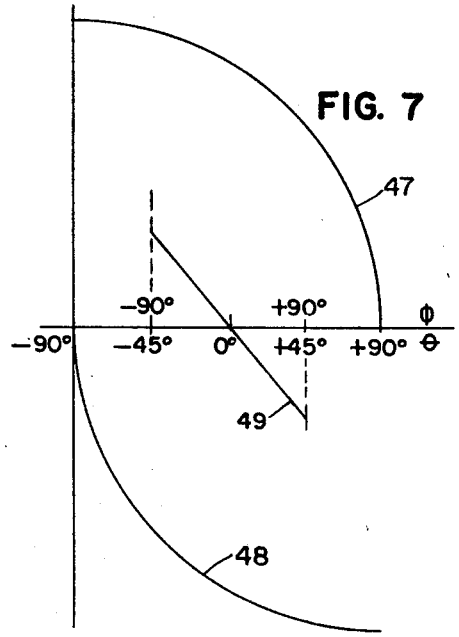
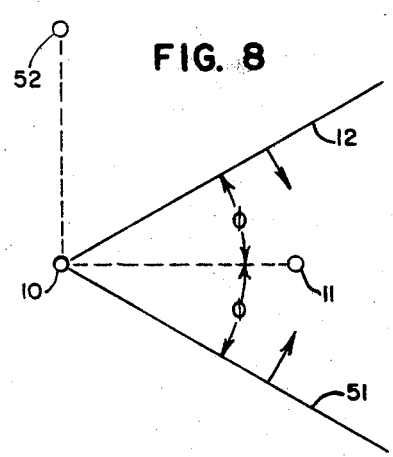
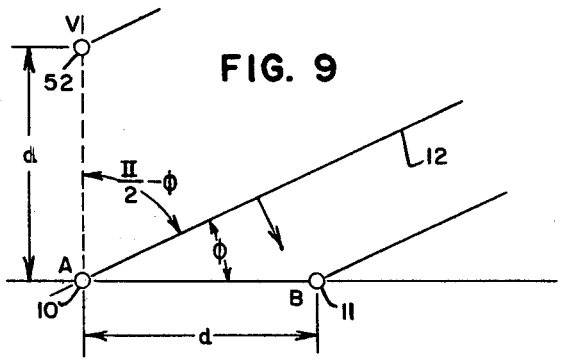

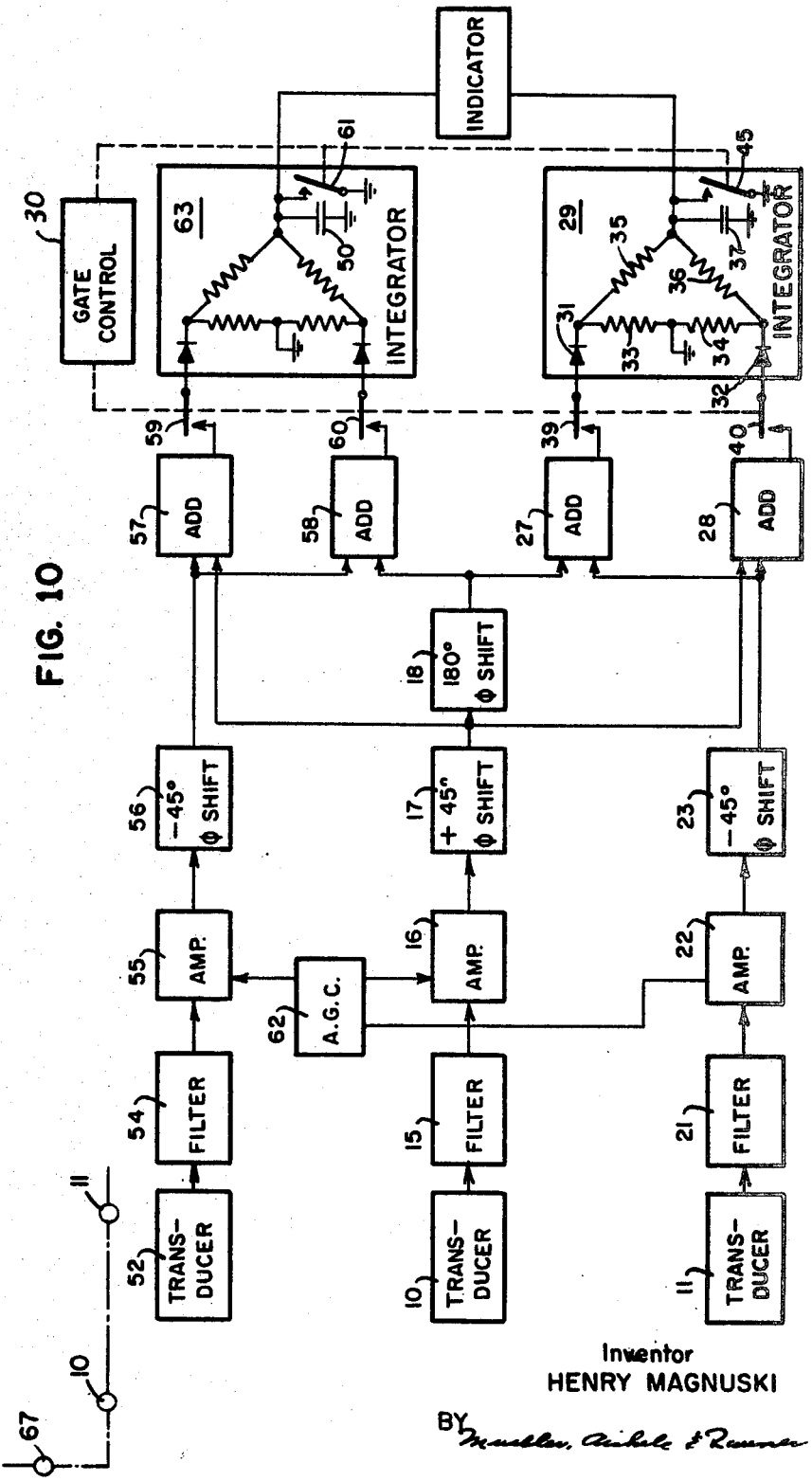

United States Patent Office 3,392,392
Patented July 9, 1968

3,392,392
BEARING MEASUREMENT SYSTEM USING
STATISTICAL SIGNAL PROCESSING BY
ANALOG TECHNIQUES
Henry Magnuski, Glenview, Ill., assignor to Motorola,
Inc., Franklin Park, Ill., a corporation of Illinois
Filed June 5, 1967, Ser. No. 643,664
11 Claims. (Cl. 343—113)

ABSTRACT OF THE DISCLOSURE

A bearing measurement system using statistical processing techniques to determine the bearing of a received signal is the presence of random noise signals. The signals are received by two or more transducers which are paired and processed to form signals proportional to the phase angle between the received signals at each of the pair of transducers. After processing the signals are integrated to remove the effect of random noise signals.

References

This system is useful with statistical information detection systems such as are described in the applications of Ernest A. Keller, Ser. No. 436,735, filed Mar. 3, 1965, now abandoned and refiled on Feb. 21, 1967, as continuing application Ser. No. 633,641; and Donald O. Rail, Ser. No. 441,104, filed Mar. 19, 1965, now Patent No. 3,339,204.

Summary

It is, therefore, an object of this invention to provide an improved bearing measuring system having a high degree of accuracy.

Another object of this invention is to provide a bearing measuring system using a linear statistical system processing by analog techniques.

In practicing this invention a processing unit is provided which uses the phase angle between the same signal received at each of a pair of transducers to determine the bearing angle of a received signal. The received signals are processed and combined to produce a bearing signal proportional to the bearing of the received signal. The bearing signal is integrated over a desired time period to reduce the effects of random waves from random directions.

In processing the signals, the signal from the second transducer in a pair of transducers is first shifted 90° in phase and then added to the signal from the first transducer and also added to the reverse (shifted by 180°) signal from the first transducer. The two signals obtained by these additions are rectified, combined and integrated to form a bearing signal. A third transducer paired with the first one or a separate pair of transducers may be used to resolve ambiguities in the bearing signal if the signal is propagating in a plane. For three dimensional systems a fourth transducer or a third pair of transducers will be required to resolve ambiguities.

The invention is illustrated in the drawings of which:
FIG. 1 is a drawing showing the receipt of a signal wave by a pair of transducers;
FIG. 2 is a partial block diagram, and partial schematic of the system of this invention;
FIGS. 3 and 4 are phasor diagrams illustrating the operation of the system of FIG. 2;

FIG. 5 is an alternate arrangement of the phase shifting network of FIG. 2;
FIGS. 6 and 7 are curves illustrating the operation of the system of FIG. 2;
FIGS. 8 and 9 illustrate the receipt of a signal wave using two pairs of transducers;
FIG. 10 is a partial block diagram and partial schematic of a system incorporating two pairs of transducers; and
FIG. 11 is an alternate arrangement of two pairs of transducers.

Description

Referring to FIG. 1 there is shown a pair of transducers 10 and 11 separated by a distance $d$. Transducers 10 and 11 may be units of various types depending upon the type of wave to be detected and respond to level changes of a physical quantity to develop an electrical signal. The signal wave 12 is received by transducer 10 first and then by transducer 11. The angle between the wave 12 and the line joining transducers 10 and 11 is represented by $\phi$.

In FIG. 2 transducers 10 and 11 are shown in block diagram form and the output signal from each transducer is coupled to filter 15 and filter 21 respectively. Filters 15 and 21 are bandpass filters having a relatively narrow bandwidth. Transducers 10 and 11 are spaced apart a distance $d$ which is equal to or less than $\lambda/4$ where $\lambda$ is the wavelength of the center frequency of filters 15 and 21.

The signal received by transducer 10 can be represented as $A = K \sin \omega t$. While the signal received at transducer 11 is represented as $B = K \sin(\omega t - \theta)$, where $$\theta = \frac{2\pi}{\lambda} d \sin \phi$$

$\theta$ represents the phase angle between the signals arriving at transducers 10 and 11 and is a function of $\sin \phi$, the angle of arrival of the signal wave. By continually integrating the phase angle using linear statistical analog techniques, it is possible to determine the bearing of a signal in the presence of noise where the signal may be 10 db or more below the noise level.

Referring again to FIG. 2 the output signals from filters 15 and 21 are coupled to balanced amplifiers 16 and 22 respectively for amplification thereby. AGC circuit 24 may be used to control the gain of amplifiers 60 and 22 to prevent distortion on strong signals.

The output of amplifiers 16 and 22 are shown in phasor form in FIG. 3. It can be seen that signal B is displaced from signal A by the angle $\theta$. After amplification the signals are processed to obtain a voltage which would be a function of the angle $\phi$ determining the direction of signal arrival. Also the processing should be so arranged that this voltage is either positive or negative and symmetrical about zero (which corresponds to $\phi = 90°$) so that the noise which comes from all directions will provide as much positive voltage as negative and will cancel out during the integration process.

In processing, the signal B from transducer 11 is shifted in phase by 90° relative to signal A from transducer 10. This is shown in FIG. 4 where $B_s$ represents the phase shifted signal from transducer 11. The phase shifting is carried out by phase shifters 17 and 23. While it is possible to achieve a 90° phase shift in a single phase shifter, by using the 90° phase shifter 68 shown in FIG. 5, the 90° phase shift is more easily accomplished by shifting the angle of the A signal from transducer 10 forward 45° and shifting the angle of the B signal from transducer 11 back 45° as shown in FIG. 2. Thus signal B is shifted by an additional 90° with respect to signal A.

After signal B has been phase shifted 90° the two signals are added and subtracted to obtain the desired differential voltages which are a function of signal direction. The outputs of phase shifters 17 and 23 are coupled to adder 28 to form the $B_s+A$ signal shown in FIG. 4. To form the $B_s-A$ signal, of FIG. 4, the A signal is shifted 180° in phase shifter 18 and added to the B signal from phase shifter 23 in adder 27.

The output of adder 28 is coupled to integrator 29 through switch 40 and is rectified by diode 32 to develop a voltage across resistor 34 which is proportional to the scaler value of the phasor $B_s+A$ of FIG. 4. This is shown as curve 41 in FIG. 6 and varies between 2A and 0. The scaler quantity representing the phasor $B_s-A$ in FIG. 4 is shown in curve 42 of FIG. 6 and is the output of adder 27. The output of adder 27 is coupled to integrator 29 through switch 39. Since it is desired to subtract this voltage diode 31 is reversed in polarity from diode 32 and a voltage represented by curve 43, FIG. 6, is developed across resistor 33. The voltage across resistors 33 and 34 are applied through resistors 35 and 36 to capacitor 37. Resistors 35 and 36 and capacitor 37 form the integration network so that the signals from adders 27 and 28 are added and integrated. The signals are integrated over many cycles and the voltage on capacitor 37 will be positive or negative depending upon the angle of arrival $\phi$ in accordance with curve 44 of FIG. 6. Gate control 30 is coupled to switches 39, 40 and 45 and acts to time the period over which integration takes place. Gate control 30 closes switches 39 and 40 at the beginning of the integration period and opens them at the end of the integration period. With switches 39 and 40 open switch 45 is momentarily closed to discharge capacitor 37 to prepare for the next integration period.

In FIG. 6 it has been assumed that the distance $d$ is equal to $\lambda/4$. Since $$\theta = \frac{2\pi}{\lambda} \cdot d \sin \phi, \quad \theta = \frac{\pi}{2} \sin \phi$$

As $\phi$ varies between zero and 90° sin $\phi$ varies between zero and 1 and, therefore, $\theta$ varies between zero and 90°. This is shown in FIG. 6. Thus, the output of the integrator 29, shown as curve 44, represents the angle $\phi$ between the wavefront and the center line between the pair of transducers.

In FIG. 7 there is shown a curve similar to that of FIG. 6 except that the spacing $d$ has been made equal to $\lambda/8$; thus $$\theta = \frac{\pi}{4} \sin \phi$$

As $\phi$ varies between 0 and 90°, sin $\phi$ varies between 0 and 1 and $\theta$ varies between 0 and $\pi/4$ or 45°. This is shown in FIG. 7 where it can be seen that the values of $\phi$ between 0 and ±90° occurs as $\theta$ varies between 0 and ±45°. By decreasing the spacing, the directional signal is limited to a more linear portion of curve 49 to reduce distortion in the output bearing signal.

When only a single pair of transducers are used an ambiguity can result as illustrated in FIG. 8. Wave 51 approaches transducers 10 and 11 at the same angle $\phi$ as wave 12 and will produce the same phase shift as wave 12. Thus, a system using a single pair of transducers would not be able to distinguish between waves arriving from the direction of 12 and the direction of wave 51.

In order to resolve this ambiguity a third transducer may be used as illustrated in FIG. 9. The transducer 52 is positioned so that a line joining transducers 10 and 52 is at a right angle to the line joining transducers 10 and 11. Transducer 52 is spaced the same distance $d$ from transducer 10 as transducer 11 is spaced from transducer 10. Transducers 10 and 11 act as one pair of transducers while transducers 10 and 52 act as a second pair of transducers. Thus, the outputs from the transducers 10, 11 and 52 of FIG. 9 would be:

$A = K \sin \omega t$
$B = K \sin (\omega t - \theta)$
$C = K \sin (\omega t - \theta')$ where:

$$\theta = \frac{2\pi}{\lambda} d \sin \phi$$

$$\theta' = \frac{-2\pi}{\lambda} d \sin \phi$$

Referring to FIG. 8 it can be seen that wave 12 will reach transducer 52 before transducer 10 so that the phase angle of the signal from transducer 52 will be advanced with respect to the signal from transducer 10 while the phase angle of the signal from transducer 11 will be retarded with respect to the signal from transducer 10. Referring to wave 51 it can be seen that the signals from both transducers 52 and 11 will be retarded in phase with respect to the signal from transducer 10. Thus, the use of the three transducers arranged as two pairs produces output signals which are unambiguous as to the direction of arrival of the wave.

A system for processing the output of three transducers is shown in FIG. 10. Transducer 52, filter 54, amplifier 55 and phase shifter 56 act in the same manner as transducer 11, filter 21, amplifier 22 and phase shifter 23. AGC circuit 62 receives the output signals from amplifiers 16, 22 and 55 and produces an AGC signal to equalize the gain of the amplifiers. The signal from transducer 10 is shifted forward in phase 45° by phase shifter 17 as previously described. The output of phase shifter 17 is coupled to adders 28 and 57. The output of 180° phase shifter 118 is coupled to adders 27 and 58. Thus, the signal from transducer 10 is combined with the signals from transducer 52 and from transducer 11. The outputs from adders 57 and 58 are combined and integrated in integrator 63 in the same manner as the signals from transducer 10 and transducer 11 were combined and integrated in integrator 29. The output of integrator 29 is designated as an X signal and the output of integrator 63 is designated as a Y signal. These signals could be applied to the X and Y deflection plates of a cathode ray tube to indicate the bearing of the received signal.

Gate control 64 coupled to switches 39, 40, 59 and 60, and 45, and 61 acts to time the periods over which integration takes place. As previously described, gate control 64 closes switches 39, 40, 59 and 60 at the beginning of the integration period and opens them at the end of the integration period. With switches 39, 40, 59 and 60 open, switches 45 and 61 are momentarily closed to discharge capacitors 37 and 50 to prepare them for the next integration period. By using Z axis modulation on the cathode ray tube the signals on capacitors 37 and 50 can be displaced at the end of the integrating period as a dot positioned at the measured bearing angle.

Four transducers, using the arrangement of transducers 10, 11, 66 and 67 (FIG. 11) could also be used. If this system were used two separate processing systems as shown in FIG. 2 would be used to develop the X and Y bearing signals.

If the wave direction is not in the X, Y plane but it is coming from any direction in X, Y, Z space, another transducer or a pair of transducers have to be added to resolve the spacial ambiguity. The processing of the signals in this case could be the same as shown on FIG. 10 except one more processing channel has to be added as it was added for transducer 52.

This invention shows how a signal can be processed by linear analog circuitry to obtain the indication of the angle of the arrival of a signal which is substantially below the noise. The linear process is relatively straight forward and simple and is particularly advantageous in processing signals where the noise is stronger than the signal.

I claim:

1. A system for indicating the bearing of a signal wave in the presence of random waves from random directions including in combination; bandpass filter means, a pair of transducers coupled to said bandpass filter means and responsive to the signal waves to develop first and second signals, said pair of transducers being spaced apart a distance equal to or less than one-fourth the wavelength of the center frequency of said bandpass filter means, first circuit means coupled to said filter means for shifting the phase of said first signal 90°, second circuit means coupled to one of said filter means and said first phase shifting means for shifting the phase of said second signal 180°, adding means coupled to said first and second circuit means for separately adding said phase shifted first signal to said second signal and said phase shifted first signal to said phase shifted second signal to develop first and second output signals, and integrating means coupled to said adding means for combining said first and second output signals and integrating the same over a time period to develop a bearing signal.

2. The bearing indicating system of claim 1 wherein; said first circuit means includes a first phase shifter for shifting the phase of said first signal 45° in one direction and a second phase shifter for shifting the phase of said second signal 45° in the opposite direction whereby the phase of said first signal is shifted 90° with respect to said second signal, said second phase shifter coupling said filter means to said second phase shifter means, said first phase shifter coupling said filter means to said adding means.

3. The bearing indicating system of claim 2 wherein; said bandpass filter means includes a first bandpass filter coupling one of said pair of transducers to said first phase shifter and a second bandpass filter coupling the other of said pair of transducers to said second phase shifter.

4. The bearing indicating system of claim 3 wherein; said adding means includes a first adder coupled to said first phase shifter and said second phase shifter and a second adder coupled to said first phase shifter and said second circuit means, said integrating means including capacitor means, first diode means and first resistance means series connecting said first adder to said capacitor means, second diode means and second resistance means series connecting said second adder to said capacitor means.

5. The bearing indicating system of claim 4 wherein; said first and second diode means are connected with opposite polarities.

6. A system for indicating the bearing of a signal wave in presence of random waves in random directions, including in combination; bandpass filter means, first and second pairs of transducers coupled to said bandpass filter means, said first pairs of transducers being responsive to the signal waves to develop first and second signals, said second pair of transducers being responsive to the signal waves to develop third and fourth signals, said transducers in each of said pairs of transducers being spaced apart a distance equal to or less than one-fourth the wavelength of the center frequency of said bandpass filter means, first phase shifting means coupled to said filter means for shifting the phase of said first signal 90° with respect to said second signal and for shifting the phase of said third signal 90° with respect to said fourth signal, second phase shifting means coupled to one of said filter means and said first phase shifting means for shifting the phase of said second signal 180° and for shifting the phase of said fourth signal 180°, adding means coupled to said first and second phase shifting means for separately adding said phase shifted first signal to said second signal, and said phase shifted first signal to said phase shifted second signal to develop first and second output signals, said adding means further separately adding said phase shifted third signal to said fourth signal, and said phase shifted third signal to said phase shifted fourth signal to develop third and fourth output signals, and integrating means coupled to said adding means for combining said first and second output signals and integrating the same over a time period to develop a first bearing signal and for combining said third and fourth output signals and integrating the same over said time period to develop a second bearing signal.

7. A system for indicating a bearing of a signal wave in the presence of random waves from random directions including in combination; bandpass filter means, first, second and third transducers coupled to said bandpass filter means and responsive to the signal waves to develop first, second and third signals respectively, said first and second transducers being spaced apart a distance equal to or less than one-fourth the wavelength of the center frequency of said bandpass filter means, said second and third transducers being spaced apart the same distance as said first and second tranducers with the line joining said second and third transducers being at right angles to the line joining said second first transducers, first circuit means coupled to said filter means for shifting the phase of said first signal 90° with respect to said second signal, and the phase of said third signal 90° with respect to said second signal, second circuit means coupled to one of said filter means and said phase shifting means for shifting the phase of said second signal 180°, adding means coupled to said first and second circuit means for separately adding said phase shifted first signal to said second signal, and said phase shifted first signal to said phase shifted second signal to develop first and second output signals and for adding said phase shifted third signal to said second signal and said phase shifted third signal to said phase shifted second signal to develop third and fourth output signals, and integrating means coupled to said adding means for combining said first and second output signals and integrating the same over a time period to develop a first bearing signal and for combining said third and fourth output signals integrating the same over said time period to develop a second bearing signal.

8. The bearing indication system of claim 7 wherein; said first circuit means includes a first phase shifter for shifting the phase of said first signal 45° in one direction, a second phase shifter for shifting the phase of said third signal 45° in said one direction and a third phase shifter for shifting the phase of said second signal 45° in the opposite direction whereby the phase of said second signal is shifted 90° with respect to said first and third signals, said third phase shifter coupling said filter means to said second phase shifter means, said first and second phase shifters coupling said filter means to said adding means, and said third phase shifter coupling said filter means to said second circuit means and said adding means.

9. The bearing indication system of claim 8 wherein; said filter means includes a first filter coupling said first transducer to said first phase shifter, a second filter coupling said third transducer to said second phase shifter and a third filter coupling said second transducer to said third phase shifter.

10. The bearing indication system of claim 9 wherein; said adding means includes a first adder coupled to said first phase shifter and said third phase shifter, a second adder coupled to said first phase shifter and said second circuit means, a third adder coupled to said second phase shifter and said third phase shifter and a fourth adder coupled to said second phase shifter and said second circuit means, said integrating means including first and second capacitor means, first diode means and first resistance means series connecting said first adder to said capacitor means, second diode means and second resistance means series connecting said second adder to said first capacitor means, third diode means and third resistance means series connecting said third adder to said second capacitor means and fourth diode means and fourth resistance means series connecting said fourth adder to said second capacitor means.

11. The bearing indication system of claim 10 wherein; said first and second diode means are connected with opposite polarities and said third and fourth diode means are connected with opposite polarities.

References Cited
UNITED STATES PATENTS 3,138,800   6/1964   Speller  ---------- 343—113 X RODNEY D. BENNETT, *Primary Examiner.*

R. E. BERGER, *Assistant Examiner.*